United States Patent [19]

Nukada et al.

[11] Patent Number: 5,440,029
[45] Date of Patent: Aug. 8, 1995

[54] TITANYL PHTHALOCYANINE CRYSTAL

[75] Inventors: Hidemi Nukada; Yasuo Sakaguchi; Taketoshi Hoshizaki; Fumio Ojima; Masayuki Nishikawa; Kohichi Yamamoto; Yumiko Komori, all of Kanagawa, Japan

[73] Assignee: Fuji Xerox Co., Ltd., Tokyo, Japan

[21] Appl. No.: 109,984

[22] Filed: Aug. 23, 1993

Related U.S. Application Data

[63] Continuation of Ser. No. 775,853, Oct. 15, 1991, abandoned.

Foreign Application Priority Data

Nov. 28, 1990 [JP] Japan ................................. 2-323181

[51] Int. Cl.$^6$ ........................ C09B 67/12; C09B 47/04
[52] U.S. Cl. .................................................. 540/141
[58] Field of Search ......................................... 540/141

[56] References Cited

U.S. PATENT DOCUMENTS

| | | | |
|---|---|---|---|
| 2,192,704 | 3/1940 | Dahlen et al. | 540/141 |
| 2,770,629 | 11/1956 | Eastes | 260/314.5 |
| 3,160,635 | 12/1964 | Knudsen | 260/314.5 |
| 3,357,989 | 12/1967 | Byrne | 260/314.5 |
| 3,708,292 | 1/1973 | Brach | 96/1.5 |
| 4,497,741 | 2/1985 | Holzle et al. | 540/123 |
| 4,499,018 | 2/1985 | Doré et al. | 540/123 |
| 4,664,997 | 5/1987 | Suzuki et al. | 430/58 |
| 4,845,209 | 7/1989 | Adam | 540/123 |
| 4,898,799 | 2/1990 | Fujimaki et al. | 540/141 |

OTHER PUBLICATIONS

McGraw-Hill Dictionary of Scientific and Technical Terms, Fourth Edition (1989).

*Primary Examiner*—Mukund J. Shah
*Assistant Examiner*—Pavanaram K. Sripada
*Attorney, Agent, or Firm*—Finnegan, Henderson, Farabow, Garrett & Dunner

[57] ABSTRACT

A novel titanyl phthalocyanine crystal, a photoconductive material comprising the same, and an electrophotographic photoreceptor using the same are disclosed. The titanyl phthalocyanine crystal has a primary particle diameter ranging from 0.03 to 0.15 μm, shows a maximum X-ray diffraction peak at a Bragg angle $(2\theta \pm 0.2°)$ of 27.3°, has a ellipsoidal tabular form, and has a BET specific surface area of not less than 35 m$^2$/g. The crystal has improved crystal form stability against solvents and holds its crystal form for an extended period of time in a dispersed and coated state. An electrophotographic photoreceptor using the crystal as a photoconductive material is excellent in sensitivity, stability, and durability.

2 Claims, 12 Drawing Sheets

TITANYL PHTHALOCYANINE CRYSTAL

This application is a continuation of application Ser. No. 07/775,853 filed Oct. 15, 1991, now abandoned.

FILED OF THE INVENTION

The present invention relates to a novel crystal of titanyl phthalocyanine useful as a photoconductive material, a photoconductive material comprising the same, and an electrophotographic photoreceptor using the same.

BACKGROUND OF THE INVENTION

Phthalocyanine compounds are useful as coatings, printing inks, catalysts or electronic materials. In recent years, they have been extensively studied particularly for their use as electrophotographic photoreceptor materials, optical recording materials and photoelectric conversion materials.

In general, phthalocyanine compounds are known to have several different crystal forms depending on the process of production or the process of treatment. The difference in crystal form is known to have a great influence on their photoelectric conversion characteristics. For example, known crystal forms of copper phthalocyanine compounds include α-, π-, χ-, ρ-, γ- and δ-forms as well as a stable β-form. It is known that these crystal forms are capable of mutual transformation by a mechanical strain, a sulfuric acid treatment, an organic solvent treatment, a heat treatment and the like as described, e.g., in U.S. Pat. Nos. 2,770,629, 3,160,635, 3,708,292, and 3,357,989. Further, a relationship between the crystal form of copper phthalocyanine and electrophotographic sensitivity is described in JP-A-50-38543 (the term "JP-A" as used herein means an "unexamined published Japanese patent application").

With respect to titanyl phthalocyanine, various crystal forms in relation to electrophotographic characteristics have been reported. For example, JP-A-62-67094 describes a stable β-form, JP-A-61-217050 describes an α-form obtained by acid pasting or solvent treatment. Other crystal forms are disclosed in JP-A-63-366, JP-A-63-20365, JP-A-64-17066, and JP-A-1-153757.

However, any of the above-described titanyl phthalocyanine compounds proposed to date has poor crystal form stability against solvents and therefore, when dispersed and coated, cannot hold its crystal form for a long period of time.

Moreover, it is still unsatisfactory in photosensitivity and durability when used as a photosensitive material. That is, electrophotographic characteristics of titanyl phthalocyanine crystals are liable to variation depending on the diameter of primary particles, the specific surface area or shape of crystal grains, the absorbed water content, etc., thus making it difficult to obtain an electrophotographic photoreceptor having stable performance properties.

SUMMARY OF THE INVENTION

An object of the present invention is to provide a novel titanyl phthalocyanine crystal which produces an electrophotographic photoreceptor having high photosensitivity and improved stability.

Another object of the present invention is to provide a photoconductive material comprising such a titanyl phthalocyanine crystal which has high sensitivity, improved stability, and prolonged durability.

A further object of the present invention is to provide an electrophotographic photoreceptor containing such a titanyl phthalocyanine crystal as a photoconductive material.

Other objects and effects of the present invention will be apparent from the following description.

As a result of extensive investigations, the inventors have found that crystal form stability of a titanyl phthalocyanine crystal showing a diffraction peak at a Bragg angle ($2\theta \pm 0.2°$) of 27.3° can be improved by controlling the primary particle size within a specific range and specifying the shape of the crystal. The crystal having the thus improved stability holds its crystal form for a prolonged period of time even after being dispersed and coated. When used as a photoconductive material, it provides an electrophotographic photoreceptor having high sensitivity, improved stability, and prolonged durability. The present invention has thus been completed based on the above finding.

The present invention relates to a titanyl phthalocyanine crystal having a primary particle diameter ranging from 0.03 to 0.15 μm, showing a maximum X-ray diffraction peak at a Bragg angle ($2\theta \pm 0.2°$) of 27.3°, having a ellipsoidal tabular form, and having a BET specific surface area of not less than 35 m$^2$/g.

The present invention also relates to an electrophotographic photoconductive material comprising the above-described titanyl phthalocyanine crystal.

The present invention further relates to an electrophotographic photoreceptor comprising a support having thereon a photosensitive layer comprising a binder resin having dispersed therein the above-described titanyl phthalocyanine crystal, said photosensitive layer showing a maximum X-ray diffraction peak at a Bragg angle ($2\theta \pm 0.2°$) of 27.3°.

DETAILED DESCRIPTION OF THE INVENTION

Figure 1:
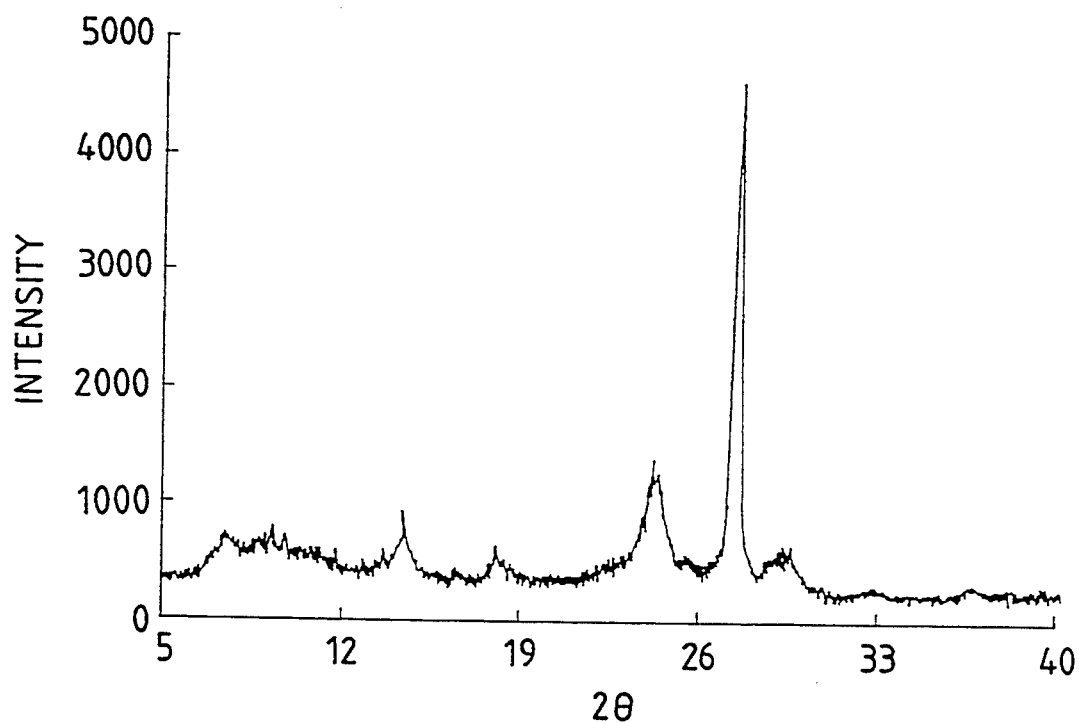
FIGS. 1 through 9 each show an X-ray diffraction pattern of the titanyl phthalocyanine crystals obtained in Examples 1 through 9, respectively.

It is essential that the titanyl phthalocyanine crystal according to the present invention should have an X-ray diffraction pattern showing a maximum peak at a Bragg angle ($2\theta \pm 0.2°$) of 27.3° and, at the same time, has a primary particle diameter ranging from 0.03 to 0.15 μm. If the primary particle diameter is less than 0.03 μm, the crystal has poor crystal form stability against solvents and is liable to be transformed to other crystal forms. If an average primary particle diameter exceeds 0.15 μm, or if primary particles greater than 0.15 μm in diameter are present, an electrophotographic photoreceptor prepared from such crystals would have considerably reduced sensitivity and stability.

Further, the titanyl phthalocyanine crystal of the present invention must have an ellipsoidal tabular form. The term "ellipsoidal tabular form" used herein means a crystal form in which the ratio of the long axis to the short axis is more than 1/1, that is the long axis is longer than the short axis even by a little. The ratio of the long axis to the short axis is preferably 2/1 or more.

The titanyl phthalocyanine crystal of the present invention must have a BET specific surface area of not less than 35 m$^2$/g. If the specific surface area is less than 35 m$^2$/g, the resulting electrophotographic photoreceptor tends to have considerably reduced sensitivity and stability.

Furthermore, the titanyl phthalocyanine crystal of the present invention preferably has an adsorbed water content within a specific range. Specifically, under the condition of 20° C. and 40% RH (relative humidity), the adsorbed water content preferably falls within a range of from 0.5% of its own weight to the saturated water adsorption. If the adsorbed water content is less than 0.5% of its own weight, the resulting electrophotographic photoreceptor tends to have reduced sensitivity and stability.

The above-described titanyl phthalocyanine crystal according to the present invention can be prepared, for example, as follows. However, the production process is not limited to the following.

Titanyl phthalocyanine is synthesized, for example, by the reaction between diiminoisoindoline and titanium alkoxide or between phthalocyanine and titanium tetrachloride in an organic solvent, as described, e.g., in U.S. Pat. Nos. 4,664,997 and 4,898,799.

Titanyl phthalocyanine synthetically prepared is poured into 1 to 100 times the weight, and preferably from 3 to 50 times the weight, of concentrated sulfuric acid having a concentration of from 70 to 100%, and preferably from 90 to 100%, at a temperature of from −20° to 100° C., and preferably from 0° to 60° C., to form a solution or a slurry.

The resulting solution or slurry is then poured into a solvent to precipitate a crystal. The solvent which can be used for precipitation is selected from alcohol solvents, aromatic solvents, mixed solvents of an alcohol solvent and water, mixed solvents of an alcohol solvent and an aromatic solvent, and mixed solvents of an aromatic solvent and water. Examples of the alcohol solvents include methanol and ethanol. Examples of the aromatic solvents include benzene, toluene, monochlorobenzene, dichlorobenzene, trichlorobenzene, and phenol. In using a mixed solvent, the alcohol solvent to water weight ratio is from 100/0 to 10/90, and preferably from 100/0 to 40/60; the alcohol solvent to aromatic solvent weight ratio is from 100/0 to 10/90, and preferably from 100/0 to 50/50; and the aromatic solvent to water weight ratio is from 100/0 to 1/99, and preferably from 60/40 to 5/95.

The amount of the solvent to be used ranges from 2 to 50 times, and preferably from 5 to 20 times, the volume of the concentrated sulfuric acid solution or slurry. The temperature of the solvent is set at 0° to 50° C., and preferably 10° C. or lower.

The precipitated crystal is collected by filtration and washed with an appropriate solvent, or the collected crystal is subjected to a solvent treatment or a grinding treatment in a solvent.

Examples of the solvent which can be used for the washing or the solvent treatment include an alcohol solvent, an aromatic solvent, a mixed solvent of an alcohol solvent and water, a mixed solvent of an alcohol solvent and an aromatic solvent, and a mixed solvent of an aromatic solvent and water. The washing with a solvent or the solvent treatment can be carried out by stirring the isolated titanyl phthalocyanine crystal in the above-mentioned solvent at a temperature of from room temperature to 100° C. for a period of from 1 to 5 hours.

Examples of apparatus to be used for the grinding treatment include, while not being limited, an attritor, a roll mill, a ball mill, a sand mill, and a homomixer. The amount of the solvent to be used for the grinding treatment preferably ranges from 5 to 50 times the weight of titanyl phthalocyanine. Examples of the solvents to be used include for the grinding treatment water, an alcohol solvent, an aromatic solvent, a mixed solvent of an alcohol solvent and water, a mixed solvent of an alcohol solvent and an aromatic solvent, and a mixed solvent of an aromatic solvent and water. Examples of the alcohol solvents include methanol and ethanol. Examples of the aromatic solvents include benzene, toluene, monochlorobenzene, dichlorobenzene, trichlorobenzene, and phenol. In using a mixed solvent, the alcohol to water weight ratio is from 100/0 to 10/90, and preferably from 100/0 to 50/50; the alcohol solvent to aromatic solvent weight ratio is from 100/0 to 10/90, and preferably from 100/0 to 50/50; and the aromatic solvent to water weight ratio is from 100/0 to 1/99, and preferably from 60/40 to 3/97.

The titanyl phthalocyanine crystal obtained by the above-described treatments have an ellipsoidal tabular form and a primary particle diameter ranging from 0.03 to 0.15 μm.

Electrophotographic photoreceptors according to the present invention in which the above-described titanyl phthalocyanine crystal is used as a photoconductive material in the photosensitive layer thereof are explained below by referring to the accompanying drawings.

Figure 20A:
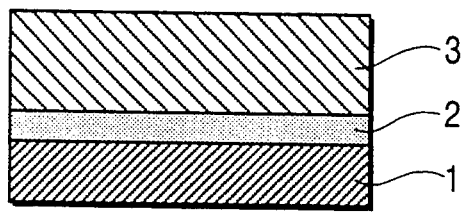
FIGS. 20 and 21 each show a schematic cross-sectional view of the electrophotographic photoreceptors according to the present invention.
Figure 20B:
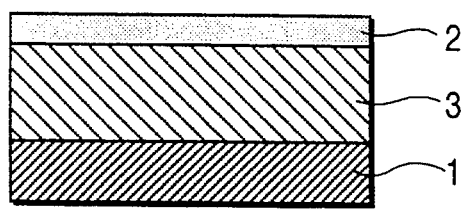
Figure 20C:
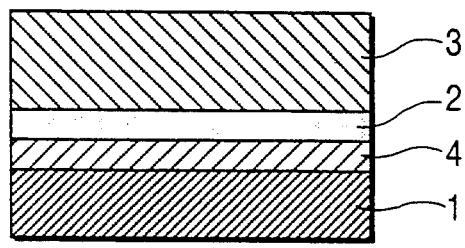
Figure 20D:
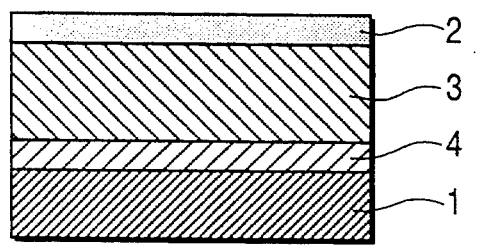
Figure 21A:
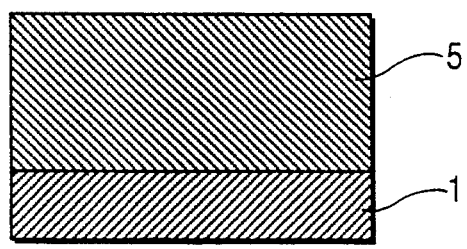
Figure 21B:
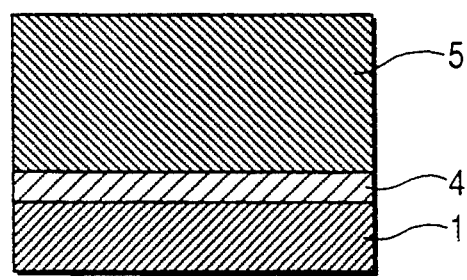

FIGS. 20 and 21 each schematically illustrate a layer structure of the electrophotographic photoreceptors according to the present invention. Photoreceptors in which a photosensitive layer has a laminate structure are shown in FIGS. 20(a) to (d). In FIG. 20(a), conductive support 1 has thereon charge generating layer 2 and charge transporting layer 3 in this order. In FIG. 20(b), conductive support 1 has thereon charge transporting layer 3 and charge generating layer 2 in this order. In FIGS. 20(c) and (d), subbing layer 4 is provided on conductive support 1. Photoreceptors in which a photosensitive layer has a single layer structure are shown in FIG. 21. In FIG. 21(a), conductive support 1 has thereon photoconductive layer 5. In FIG. 21(b), subbing layer 4 is provided on conductive support 1.

The charge generating layer in the laminate structures as shown in FIG. 21 is generally composed of the above-mentioned titanyl phthalocyanine crystal and a binder resin. Binder resins to be used can be chosen from a broad range of insulating resins as well as organic photoconductive polymers, e.g., poly-N-vinylcarbazole, polyvinylanthracene, and polyvinylpyrene. Preferred examples of the binder resins included insulating resins, such as polyvinyl butyral, polyarylate (e.g., a polycondensate of bisphenol A and phthalic acid), polycarbonate, polyester, phenoxy resins, vinyl chloride-vinyl acetate copolymers, polyvinyl acetate, acrylic resins, polyacrylamide, polyamide, polyvinylpyridine, cellulose resins, urethane resins, epoxy resins, casein, polyvinyl alcohol, and polyvinyl pyrrolidone. Among these, polyvinyl butyral and vinyl chloride-vinyl acetate copolymers are more preferred.

The charge generating layer can be formed by coating a conductive support or a charge transporting layer (hereinafter described) with a coating composition prepared by dispersing the titanyl phthalocyanine crystal in a solution of a binder resin in an appropriate organic solvent, followed by drying. The weight ratio of the titanyl phthalocyanine crystal to the binder resin is preferably from 40/1 to 1/10, and preferably from 10/1 to 1/4. If the ratio of the titanyl phthalocyanine crystal is too high, the coating composition has reduced stability. If it is too low, the resulting photoreceptor has reduced sensitivity.

Solvents to be used in the coating composition are preferably selected from those incapable of dissolving a lower layer on which the charge generating layer is provided. Examples of the solvents include alcohols, e.g., methanol, ethanol, and isopropanol; ketones, e.g., acetone, methyl ethyl ketone, and cyclohexanone; amides, e.g., N,N-dimethylformamide and N,N-dimethylacetamide; dimethyl sulfoxide; ethers, e.g., tetrahydrofuran, dioxane, and ethylene glycol monomethyl ether; esters, e.g., methyl acetate and ethyl acetate; aliphatic halogenated hydrocarbons, e.g., chloroform, methylene chloride, dichloroethylene, carbon tetrachloride, and trichloroethylene; and aromatic hydrocarbons, e.g., benzene, toluene, xylene, ligroin, monochlorobenzene, and dichlorobenzene.

Coating can be carried out by any of known techniques, such as dip coating, spray coating, spinner coating, bead coating, wire bar coating, blade coating, roller coating, and curtain coating. Drying is preferably conducted first at room temperature to once obtain a dry-to-touch state and then under heating at a temperature of from 30° to 200° C. for 5 minutes to 2 hours in still air or in an air flow.

The charge generating layer generally has a dry thickness of from about 0.05 to about 5 μm, and preferably from 0.1 to 1.0 μm.

The charge transporting layer is generally composed of a charge transporting material and a binder resin. Any of known charge transporting materials can be utilized, including polycyclic aromatic compounds, e.g., anthracene, pyrene, and phenanthrene; nitrogen-containing heterocyclic compounds, e.g., indole, carbazole, and imidazole; pyrazoline compounds, hydrazone compounds, triphenylmethane compounds, triphenylamine compounds, enamine compounds, and stilbene compounds.

Further included in usable charge transporting materials are photoconductive polymers, e.g., poly-N-vinylcarbazole, halogenated poly-n-vinylcarbazole, polyvinyl anthracene, poly-N-vinylphenyl anthracene, polyvinylpyrene, polyvinylacridine, polyvinyl acenaphthylene, polyglycidyl carbazole, pyrene-formaldehyde resins, and ethylcarbazole-formaldehyde resins. These polymers may form a charge transporting layer by themselves. Binder resins which can be used in the charge transporting layer can be selected from those described above with reference to the charge generating layer.

The charge transporting layer can be formed by coating a conductive support or a charge generating layer with a coating composition comprising the above-described charge transporting material, a binder resin, and an organic solvent incapable of dissolving a lower layer, on which the charge transporting layer is provided, in the same manner as for the charge generating layer. The weight ratio of the charge transporting material to the binder resin is preferably from 5/1 to 1/5.

The charge transporting layer generally has a dry thickness of from about 5 to about 50 μm.

In photoreceptors having a single layer structure as shown in FIG. 21, the photosensitive layer comprises a photoconductive layer in which the above-described titanyl phthalocyanine crystal is dispersed in a binder resin together with a charge transporting material. The ratio of the charge transporting material to the binder resin preferably ranges from about 1/20 to about 5/1, and more preferably from 1/3 to 3/1. The ratio of the titanyl phthalocyanine crystal to the charge transporting material preferably ranges from about 1/10 to about 10/1, and more preferably from 1/10 to 2/1. The charge transporting material and binder resin which can be used are selected from those enumerated above. Coating can be carried out in the same manner as described above.

Any conductive support known useful in electrophotographic photoreceptors can be used. Examples thereof include metals and alloys such as aluminum, nickel, chromium, stainless steel and the like; plastic films provided with a thin film of aluminum, titanium, nickel, chromium, stainless steel, gold, vanadium, tin oxide, indium oxide, ITO or the like; and paper or plastic films coated or impregnated with an electrical conductivity imparting agent. The shape of the conductive support can suitably selected and may be a dram form, a sheet form, a plate form and the like, but is not limited thereto.

The surface of the conductive support may be subjected to various treatment if the image quality is not adversely affected. Examples of the surface treatment include oxidation treatment, chemical treatment, coloring treatment, irregular reflection treatment such as sand blasting, and the like.

As illustrated in FIGS. 20(c) and (d) and 21(b), a subbing layer may be provided on the conductive support. A subbing layer is effective for blocking unnecessary charge which may be introduced from the conductive support thereby to improve charging properties of a photosensitive layer. It also serves to improve adhesion between a conductive support and a photosensitive layer.

Examples of the materials for constituting the subbing layer include polyvinyl alcohol, polyvinyl pyrrolidone, polyvinylpyridine, cellulose ethers, cellulose esters, polyamide, polyurethane, casein, gelatin, polyglutamic acid, starch, starch acetate, amino starch, polyacrylic acid, polyacrylamide, zirconium chelate compounds, zirconium alkoxide compounds, organozirconium compounds, titanium chelate compounds, titanium alkoxide compounds, organotitanium compounds, and silane coupling agents. The subbing layer generally has a thickness of from about 0.05 to about 2 μm.

The present invention is now illustrated in greater detail with reference to Examples, but it should be understood that the present invention is not deemed to be limited thereto. All the parts, percents and ratios are by weight unless otherwise indicated.

SYNTHESIS EXAMPLE

Synthesis of Titanyl Phthalocyanine

To 20 parts of 1-chloronaphthalene were added 3 parts of 1,3-diiminoisoindoline and 1.7 parts of titanium tetrabutoxide, and the mixture was allowed to react at 190° C. for 5 hours. The reaction product was collected by filtration and washed successively with aqueous ammonia, water, and acetone to obtain 4.0 parts of a titanyl phthalocyanine crystal.

Figure 19:
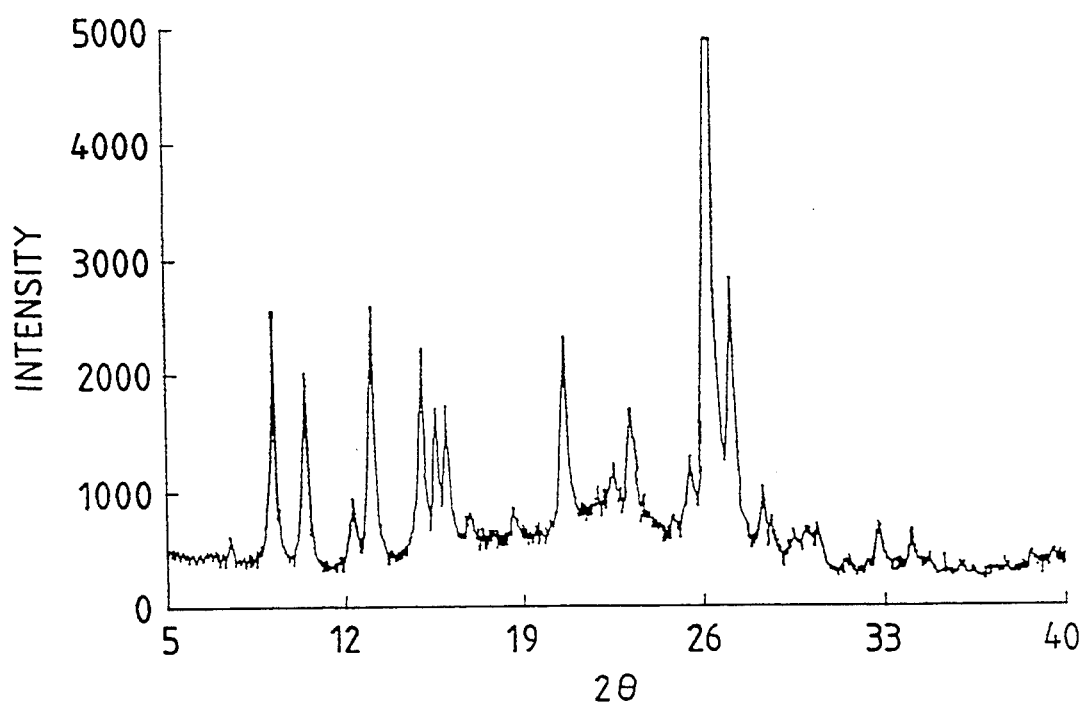
FIG. 19 shows an X-ray diffraction pattern of a synthesized titanyl phthalocyanine crystal.

A powder X-ray diffraction pattern of the resulting titanyl phthalocyanine crystal is shown in FIG. 19.

EXAMPLE 1

2.0 parts of the titanyl phthalocyanine crystal obtained in Synthesis Example were dissolved in 100 parts of 97% sulfuric acid at 0° C., and the solution was poured into an ice-cooled mixed solvent of 400 parts of methanol and 400 parts of water. The precipitated crystal was collected by filtration, washed successively with methanol, dilute aqueous ammonia and water, and then dried to obtain 1.6 parts of a titanyl phthalocyanine crystal. Observation of the resulting titanyl phthalocyanine crystal under a transmission electron microscope revealed uniform particles having a diameter of from 0.05 to 0.08 μm and an ellipsoidal tabular form. The BET specific surface area was found to be 45 m²/g. A powder X-ray diffraction pattern of the resulting titanyl phthalocyanine crystal is shown in FIG. 1.

EXAMPLE 2

Figure 2:
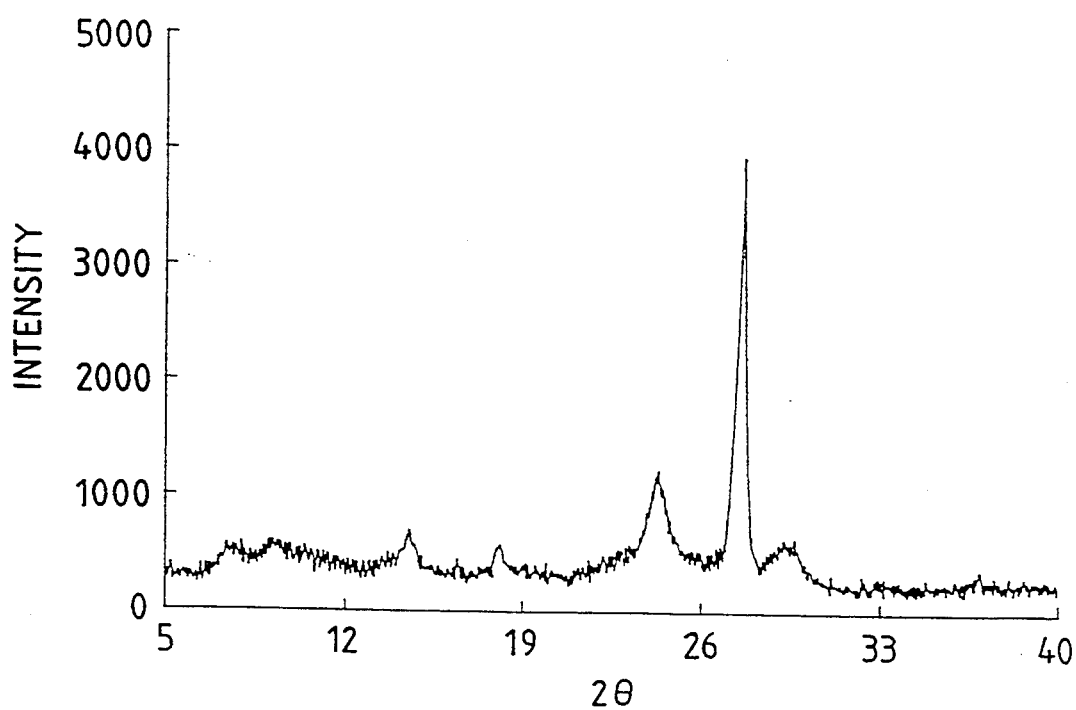

2.0 parts of the titanyl phthalocyanine crystal obtained in Synthesis Example were dissolved in 100 parts of 97% sulfuric acid at 0° C. and the solution was poured into an ice-cooled mixed solvent consisting of 400 parts of toluene and 400 parts of methanol. The precipitated crystal was filtered, washed successively with methanol, dilute aqueous ammonia, and water and then dried to obtain 1.6 parts of a titanyl phthalocyanine crystal. Observation of the resulting titanyl phthalocyanine crystal under a transmission electron microscope revealed uniform particles having a diameter of from 0.05 to 0.08 μm and an ellipsoidal tabular form. The BET specific surface area was found to be 40 m²/g. A powder X-ray diffraction pattern of the resulting titanyl phthalocyanine crystal is shown in FIG. 2.

EXAMPLE 3

Figure 3:
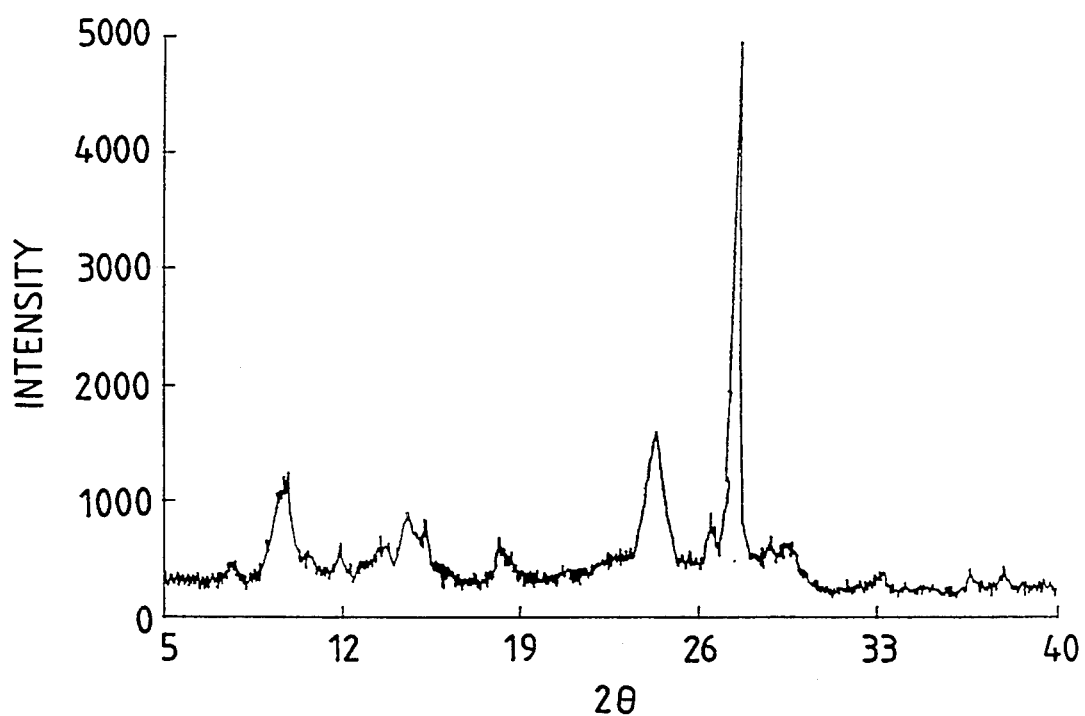

2.0 parts of the titanyl phthalocyanine obtained in Synthesis Example were dissolved in 100 parts of 97% sulfuric acid at 0° C., and the solution was poured into an ice-cooled mixed solvent consisting of 400 parts of methanol and 400 parts of water. The precipitated crystal was collected by filtration, washed successively with methanol, dilute aqueous ammonia and water. The residual water-containing titanyl phthalocyanine cake was stirred in a mixed solvent of 20 parts of water and 2 parts of monochlorobenzene at 50° C. for 1 hour, followed by filtration. The filtered cake was washed successively with methanol and water, and then dried to obtain 1.6 parts of a titanyl phthalocyanine crystal. Observation of the resulting titanyl phthalocyanine crystal under a transmission electron microscope revealed uniform particles having a diameter of from 0.05 to 0.08 μm and an ellipsoidal tabular form. The saturated water adsorption of the crystal at 20° C. and 40% RH was 4.0% of its own weight as measured by thermal analysis. The BET specific surface area was found to be 43 m²/g. A powder X-ray diffraction pattern of the resulting titanyl phthalocyanine crystal is shown in FIG. 3.

EXAMPLE 4

Figure 4:
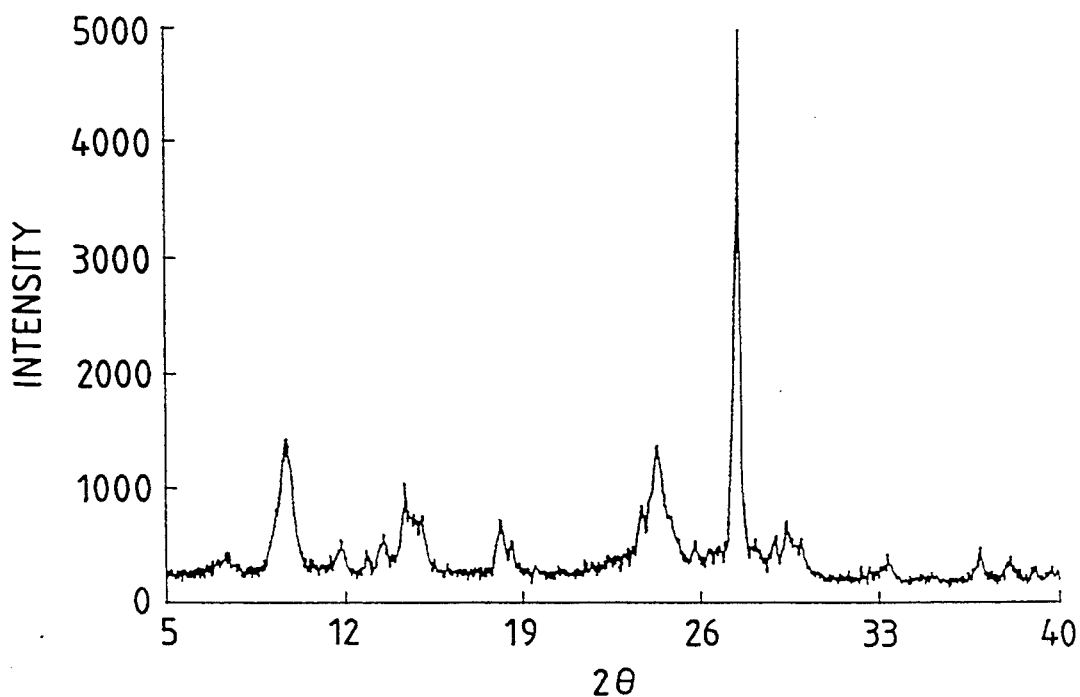

2.0 parts of the titanyl phthalocyanine crystal obtained in Synthesis Example were dissolved in 100 parts of 97% sulfuric acid at 0° C., and the solution was poured into 800 parts of ice-cooled methanol. The precipitated crystal was filtered, washed successively with methanol, dilute aqueous ammonia, and water. The residual water-containing titanyl phthalocyanine cake was stirred in 20 parts of methanol at 50° C. for 1 hour, followed by filtration. The filtered cake was washed successively with methanol and water and then dried to obtain 1.6 parts of a titanyl phthalocyanine crystal. Observation of the resulting titanyl phthalocyanine crystal under a transmission electron microscope revealed uniform particles having a diameter of from 0.05 to 0.08 μm and an ellipsoidal tabular form. The BET specific surface area was found to be 40 m²/g. A powder X-ray diffraction pattern of the resulting titanyl phthalocyanine crystal is shown in FIG. 4.

EXAMPLE 5

Figure 5:
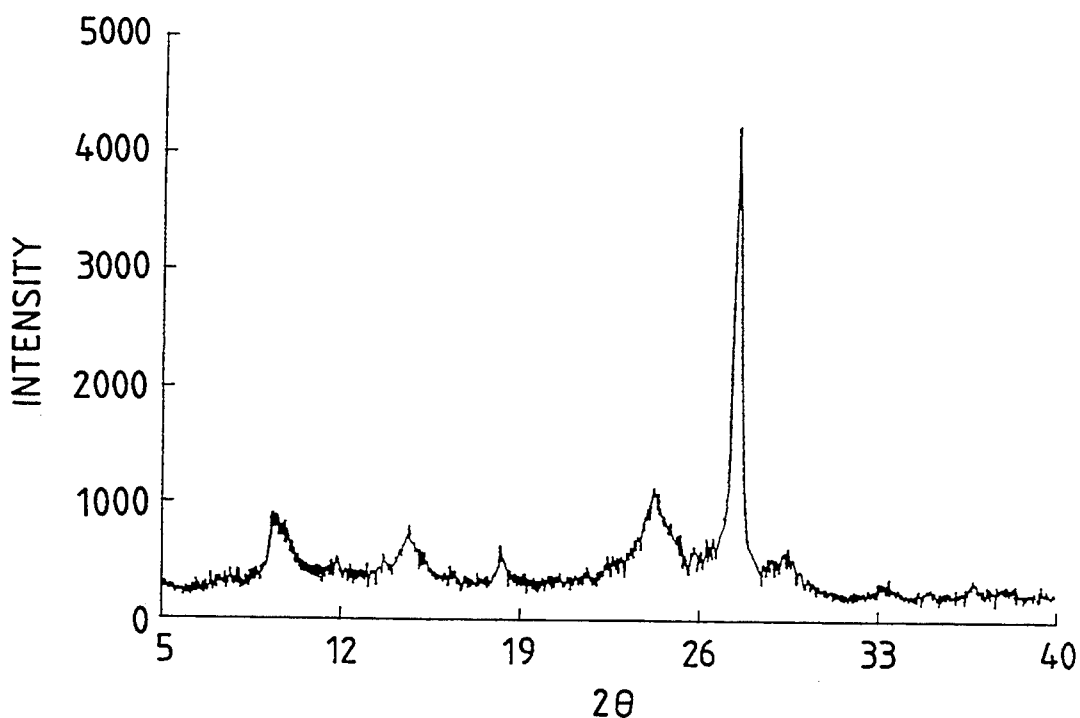

2.0 parts of the titanyl phthalocyanine crystal obtained in Synthesis Example were dissolved in 100 parts of 97% sulfuric acid at 0° C., and the solution was poured into an ice-cooled mixed solvent consisting of 1100 parts of water and 110 parts of monochlorobenzene for precipitation. The solution as containing the precipitated crystal was stirred at 50° C. for 1 hour, and the precipitate was filtered, washed successively with methanol, dilute aqueous ammonia and water. The residual water-containing titanyl phthalocyanine cake was ground in a mixed solvent of 100 parts of methanol and 100 parts of water by means of a ball mill for 50 hours, washed successively with methanol and water, and then dried to obtain 1.6 parts of a titanyl phthalocyanine crystal. Observation of the resulting titanyl phthalocyanine crystal under a transmission electron microscope revealed uniform particles having a diameter of from 0.10 to 0.13 μm and an ellipsoidal tabular form. The BET specific surface area was found to be 35 m²/g. A powder X-ray diffraction pattern of the resulting titanyl phthalocyanine crystal is shown in FIG. 5.

EXAMPLE 6

Figure 6:
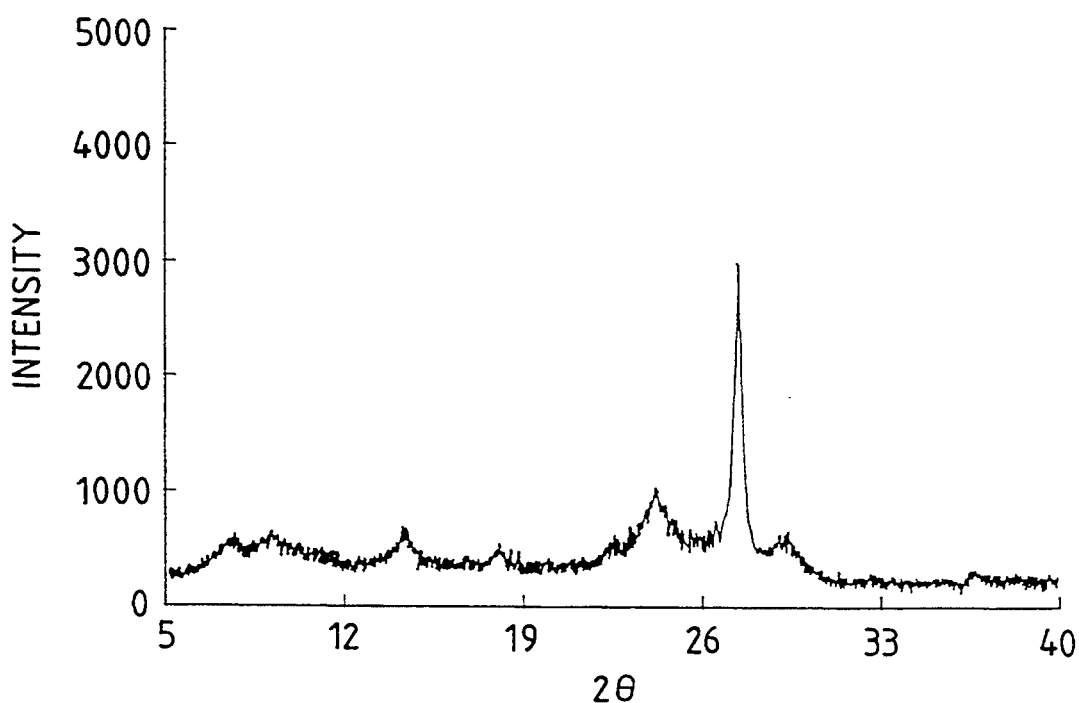

2.0 parts of the titanyl phthalocyanine crystal obtained in Synthesis Example were dissolved in 100 parts of 97% sulfuric acid at 0° C., and the solution was poured into an ice-cooled mixed solvent consisting of 400 parts of ethanol and 400 parts of water. The precipitated crystal was washed successively with methanol, dilute aqueous ammonia and water, and then dried to obtain 1.6 part of a titanyl phthalocyanine crystal. Observation of the resulting titanyl phthalocyanine crystal under a transmission electron microscope revealed uniform particles having a diameter of from 0.05 to 0.08 μm. The BET specific surface area was found to be 45 m²/g. An X-ray diffraction pattern of the resulting crystal is shown in FIG. 6.

EXAMPLE 7

Figure 7:
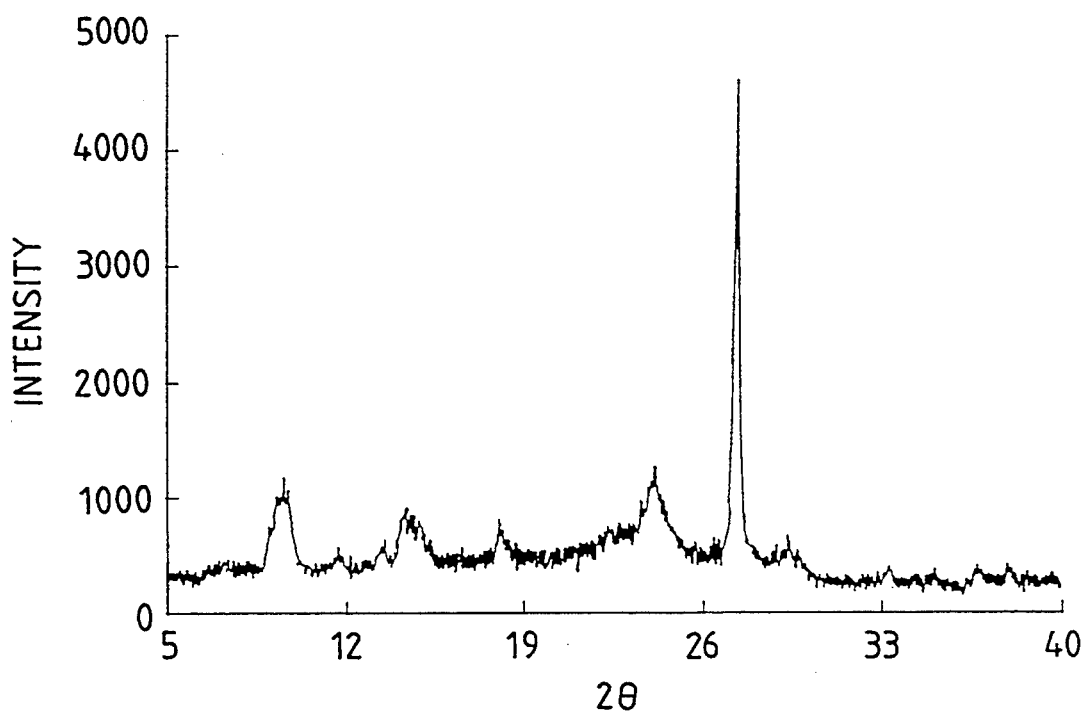

2.0 parts of the titanyl phthalocyanine crystal obtained in Synthesis Example were dissolved in 100 parts of 97% sulfuric acid at 0° C., and the solution was poured into an ice-cooled mixed solvent consisting of 400 parts of monochlorobenzene and 400 parts of methanol. The precipitated crystal was washed successively with methanol, dilute aqueous ammonia and water, and then dried to obtain 1.6 part of a titanyl phthalocyanine crystal. Observation of the resulting titanyl phthalocyanine crystal under a transmission electron microscope revealed uniform particles having a diameter of from 0.05 to 0.08 μm. The BET specific surface area was found to be 41 m²/g. An X-ray diffraction pattern of the resulting crystal is shown in FIG. 7.

EXAMPLE 8

Figure 8:
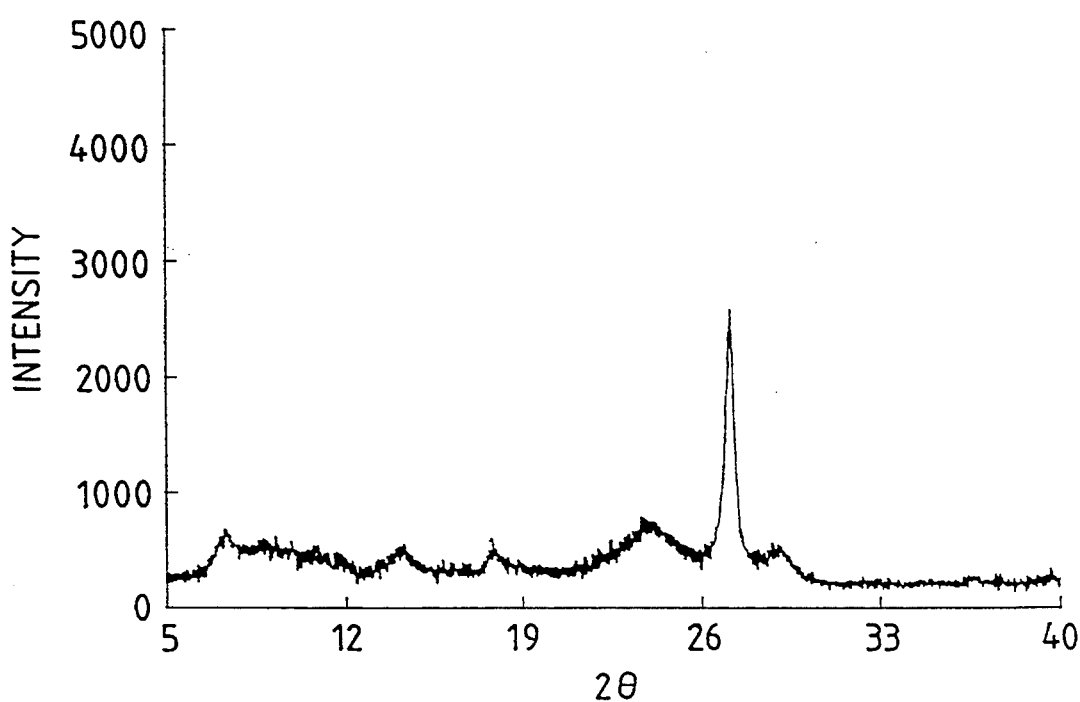

2.0 parts of the titanyl phthalocyanine crystal obtained in Synthesis Example were dissolved in 100 parts of 97% sulfuric acid at 0° C., and the solution was poured into 800 parts of ice-cooled methanol. The precipitated crystal was collected by filtration, washed successively with methanol, dilute aqueous ammonia and water, and then dried to obtain 1.6 part of a titanyl phthalocyanine crystal. Observation of the resulting titanyl phthalocyanine crystal under a transmission electron microscope revealed uniform particles having a diameter of from 0.05 to 0.08 μm. The saturated water adsorption of the crystal at 20° C. and 40% RH was 2.8% of its own weight as measured by thermal analysis. An X-ray diffraction pattern of the resulting crystal is shown in FIG. 8.

EXAMPLE 9

Figure 9:
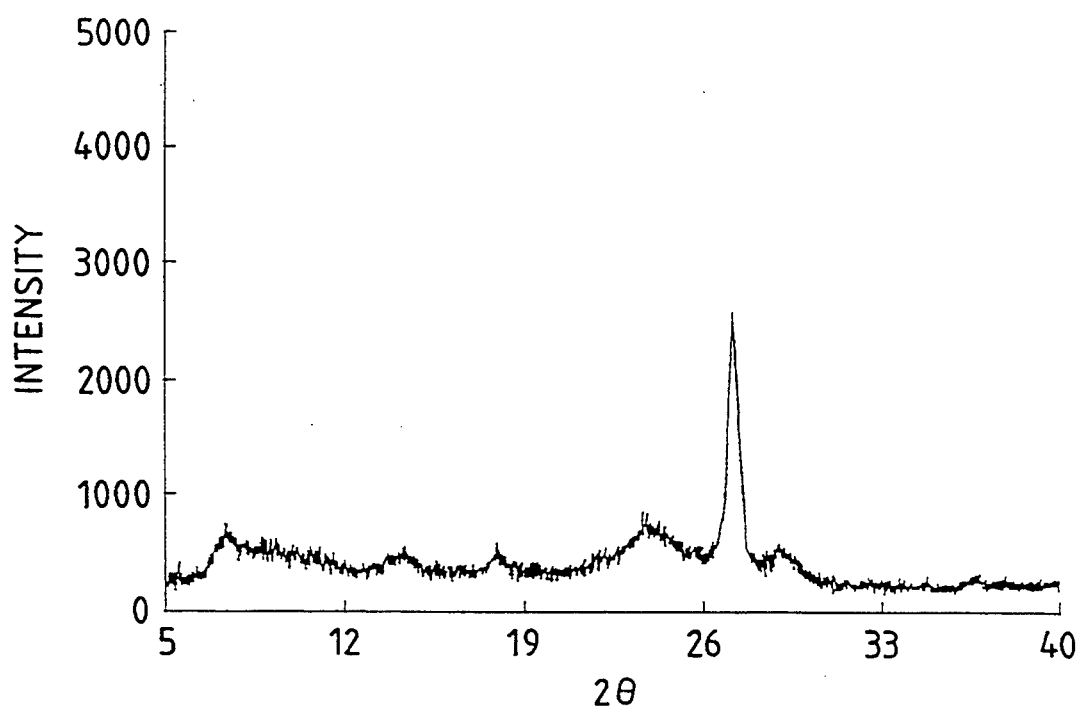
Figure 10:
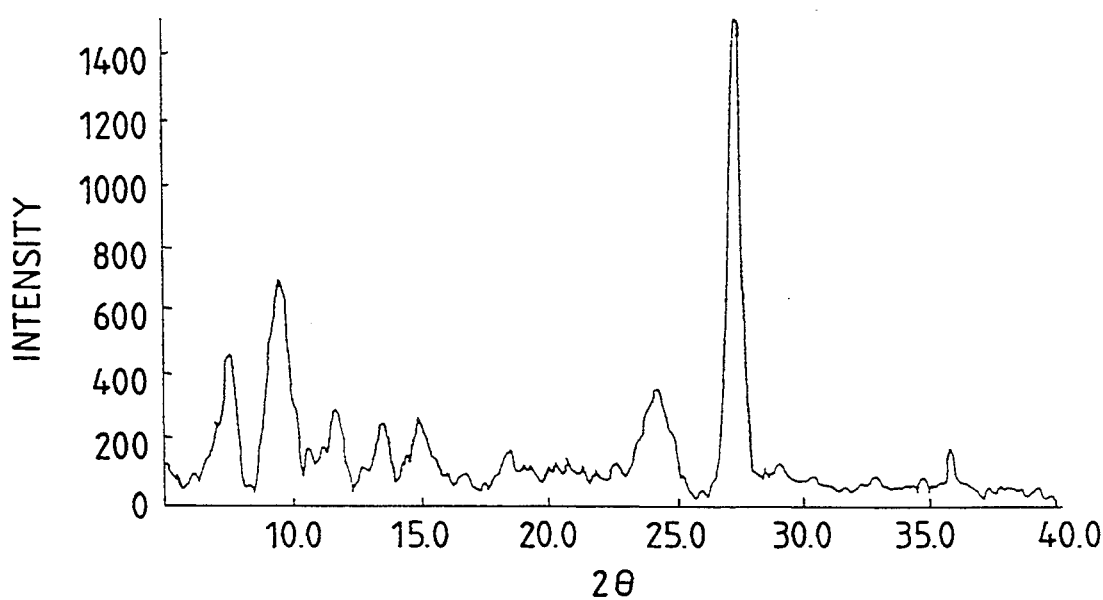
FIGS. 10 through 14 each show an X-ray diffraction pattern of a charge generating layer of the electrophotographic photoreceptor according to the present invention.
Figure 11:
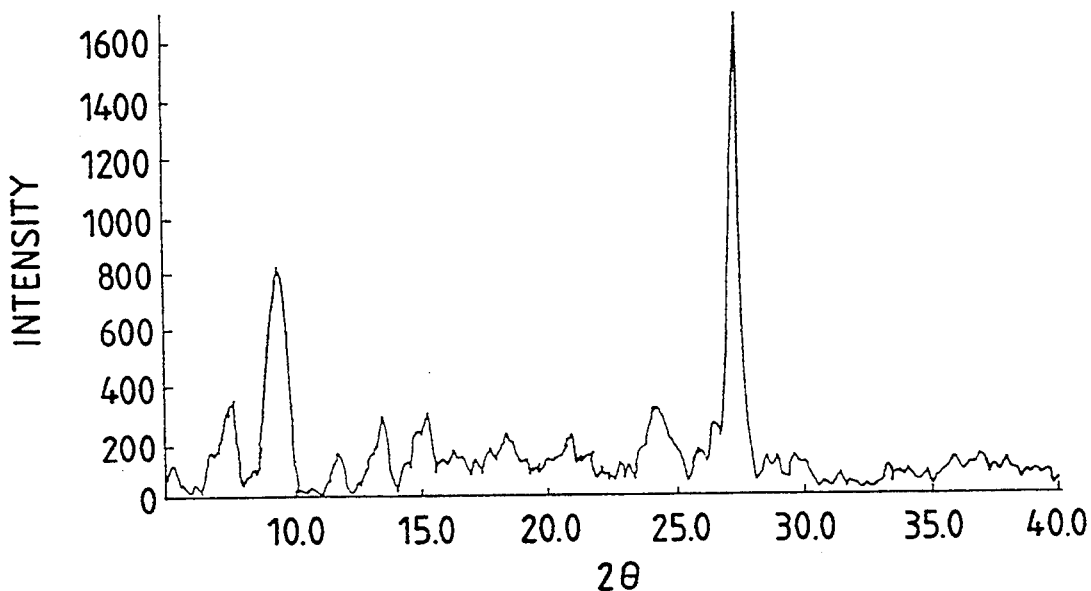
Figure 12:
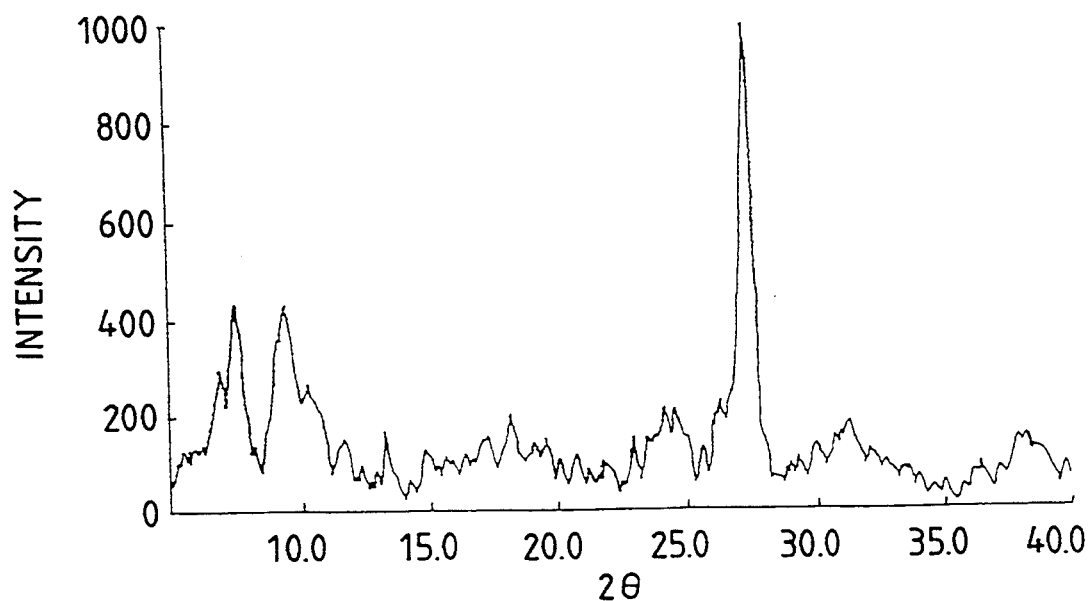
Figure 13:
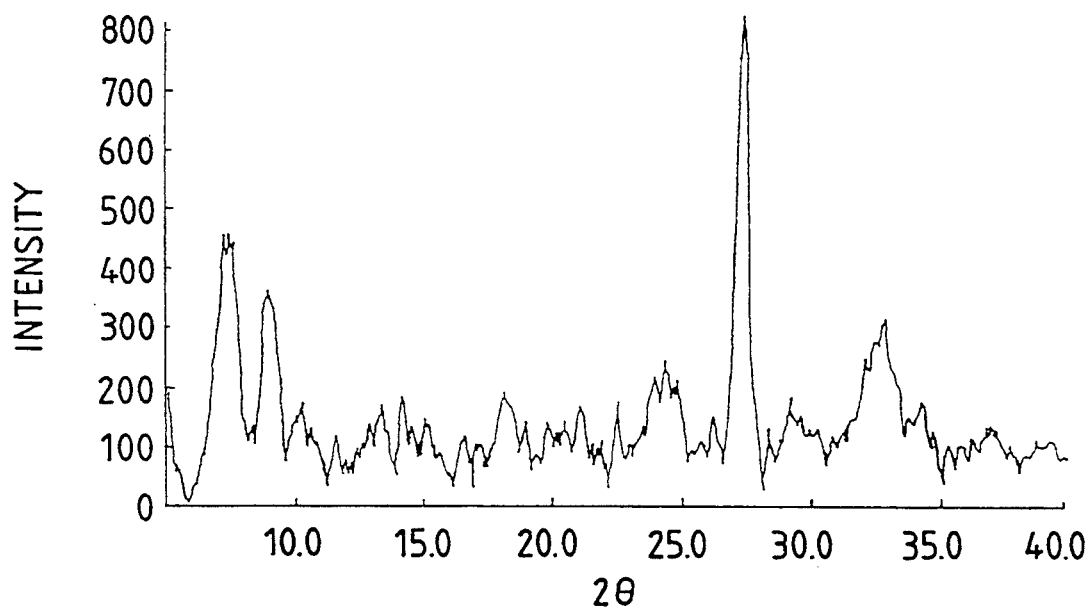
Figure 14:
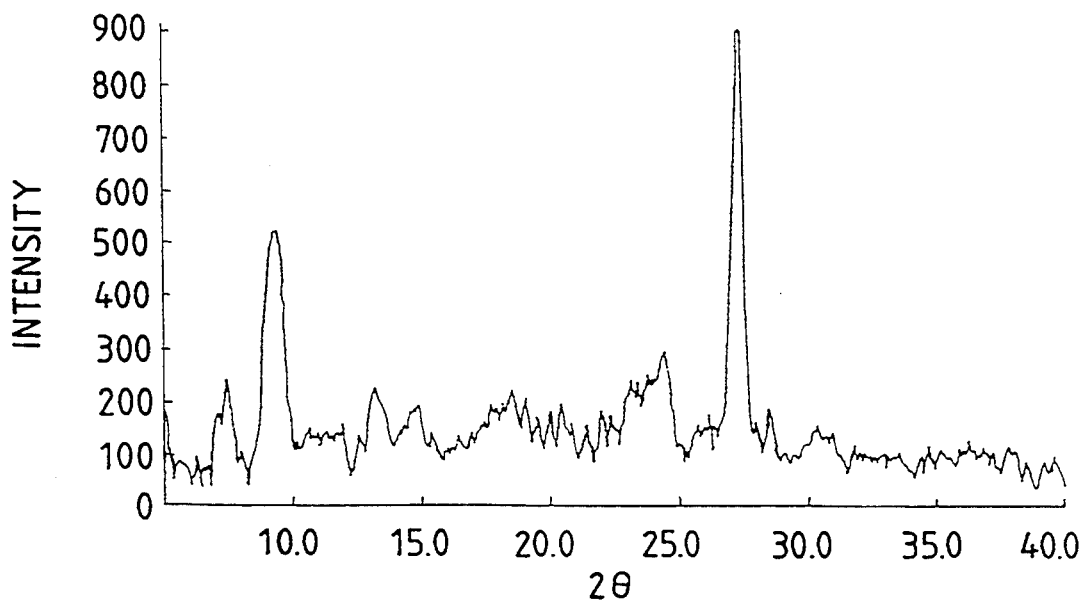

2.0 parts of the titanyl phthalocyanine crystal obtained in Synthesis Example were dissolved in 100 parts of 97% sulfuric acid at 0° C., and the solution was poured into an ice-cooled mixed solvent of 400 parts of toluene and 400 parts of methanol. The precipitated crystal was collected by filtration, washed successively with methanol, dilute aqueous ammonia and water. The residual water-containing titanyl phthalocyanine cake was stirred in a mixed solvent composed of 20 parts of water and 2 parts of monochlorobenzene at 50° C. for 1 hours, and then collected by filtration and washed with methanol and water, followed by drying to obtain 1.6 part of a titanyl phthalocyanine crystal. Observation of the resulting titanyl phthalocyanine crystal under a transmission electron microscope revealed uniform particles having a diameter of from 0.05 to 0.08 μm. The saturated water adsorption of the crystal at 20° C. and 40% RH was 3.0% of its own weight as measured by thermal analysis. An X-ray diffraction pattern of the resulting crystal is shown in FIG. 9.

EXAMPLES 10 TO 14

1 part each of the titanyl phthalocyanine crystals obtained in Examples 1 to 5 was mixed with 1 part of polyvinyl butyral ("S-Lec BM-S", produced by Sekisui Chemical Co., Ltd.) and 100 parts of cyclohexanone, and the mixture was dispersed in a paint shaker together with glass beads for 1 hour. The resulting coating composition was coated on an aluminum support by dip coating and dried by heating at 100° C. for 5 minutes to form a 0.2 μm thick charge generating layer. An X-ray diffraction pattern of each of the charge generating layers thus formed is shown in FIGS. 10 to 14.

In 8 parts of monochlorobenzene were dissolved 1 part of a compound of formula:

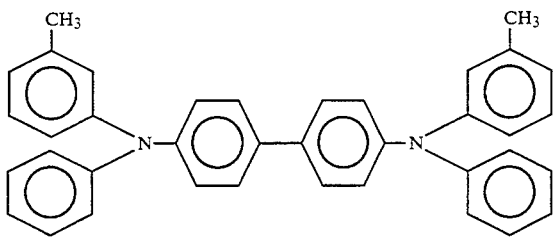

and 1 part of poly(4,4-cyclohexylidenediphenylenecarbonate) of formula:

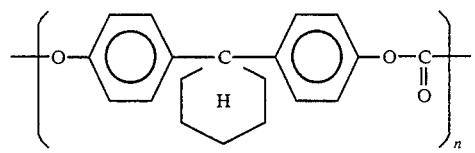

(n: degree of polymerization)

and the resulting coating composition was coated on the charge generating layer by dip coating and dried by heating at 120° C. for 1 hour to form a 20 μm thick charge transporting layer.

The following measurements were made on the resulting electrophotographic photoreceptor by means of an electrostatic paper analyzer ("EPA-8100" manufactured by Kagaguchi Denki K. K.) under a normal temperature and normal humidity condition (20° C., 40% RH), a low-temperature and low-humidity condition (10° C., 15% RH), or a high-temperature and high-humidity condition (28° C., 85% RH).

1) $V_{DDP}$: Surface potential after 1 second from negative charging to $-6.0$ kV
2) E: Decay rate of surface potential with monochromatic light of 800 nm isolated by a band pass filter
3) $V_{RP}$: Residual surface potential after exposure to white light of 50 erg/cm² for 0.5 second
4) $\Delta E_{\frac{1}{2}}$: Change in $E_{\frac{1}{2}}$ among different environmental conditions
5) $\Delta V_{DDP}$: Difference between initial $V_{DDP}$ and $V_{DDP}$ after 1,000 times repetition of the above-described charging and exposure
6) $\Delta V_{RP}$: Difference between initial $V_{RP}$ and $V_{RP}$ after 1,000 times repetition of the above-described charging and exposure.

The results obtained are shown in Table 1 below.

EXAMPLES 15 TO 18

An electrophotographic photoreceptor was produced in the same manner as in Examples 10 to 14, except for using each of the titanyl phthalocyanine crystals obtained in Examples 6 to 9. The resulting photoreceptors were evaluated in the same manner, and the results obtained are shown in Table 1.

COMPARATIVE EXAMPLE 1

Figure 15:
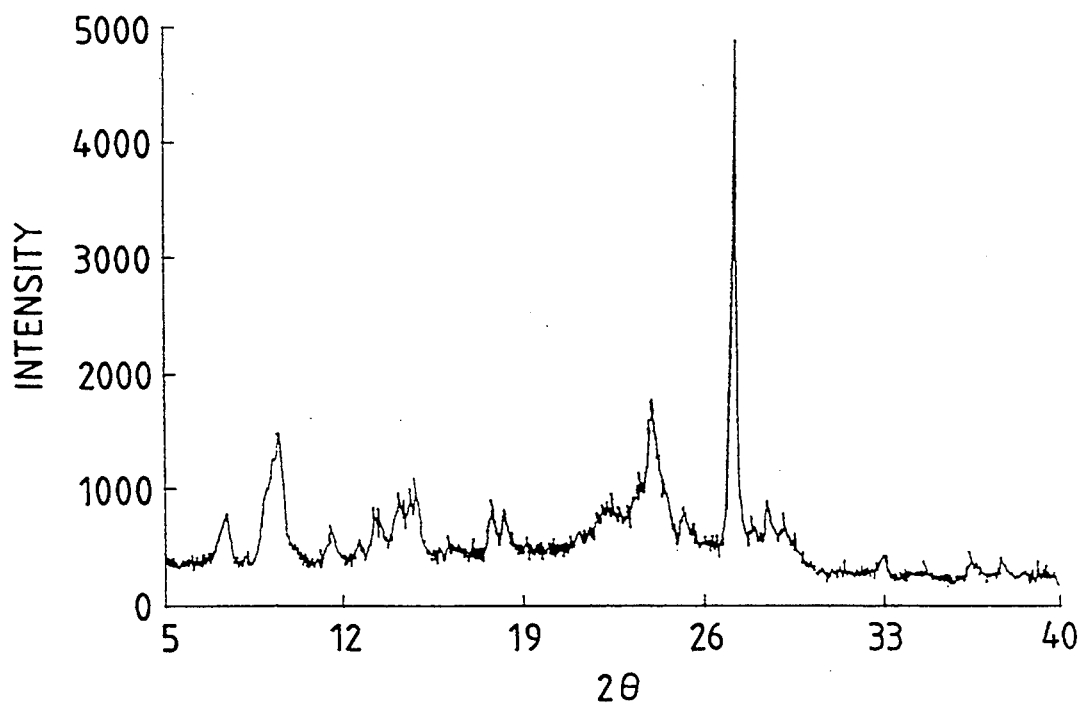
FIGS. 15 and 16 respectively show an X-ray diffraction pattern of the titanyl phthalocyanine crystal used in Comparative Example 1 and that of a charge generating layer of the electrophotographic photoreceptor using the same.

2.0 parts of the titanyl phthalocyanine crystal obtained in Synthesis Example were dissolved in 100 parts of 97% sulfuric acid at 0° C., and the solution was poured into 800 parts of ice-cooled water. The precipitated crystal was collected by filtration, washed successively with methanol, dilute aqueous ammonia and water. The residual water-containing titanyl phthalocyanine cake was stirred in a mixed solvent of 20 parts of water and 2 parts of monochlorobenzene at 50° C. for 1 hour, followed by filtration. The filter cake was washed successively with methanol and water, and then dried to obtain 1.6 part of a titanyl phthalocyanine crystal. Observation of the resulting titanyl phthalocyanine crystal under a transmission electron microscope revealed non-uniform particles having a diameter of from 0.05 to 0.5 μm and an amorphous crystal form. An X-ray diffraction pattern of the resulting crystal is shown in FIG. 15.

Figure 16:
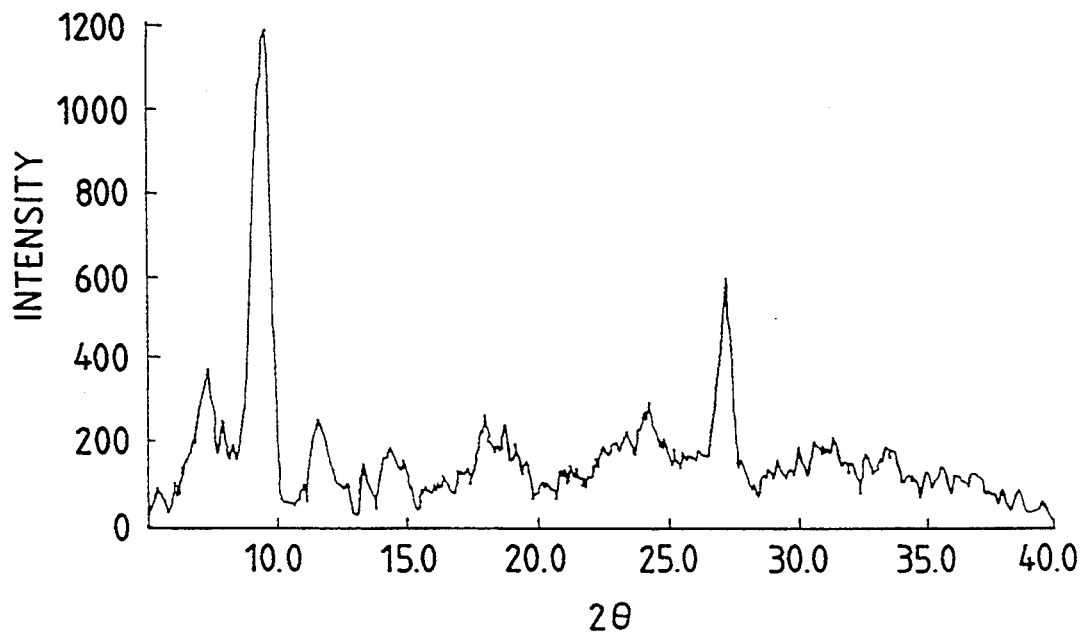

An electrophotographic photoreceptor was produced in the same manner as in Examples 10 to 14, except for using the resulting titanyl phthalocyanine crystal as a charge generating material. The resulting photoreceptor was evaluated in the same manner, and the results obtained are shown in Table 1. An X-ray diffraction pattern of the charge generating layer is shown in FIG. 16. As can be seen from FIG. 16, the peak at a Bragg angle ($2\theta \pm 0.2°$) of 27.3° is not the maximum, indicating that the crystal form had been transformed.

COMPARATIVE EXAMPLE 2

Figure 17:
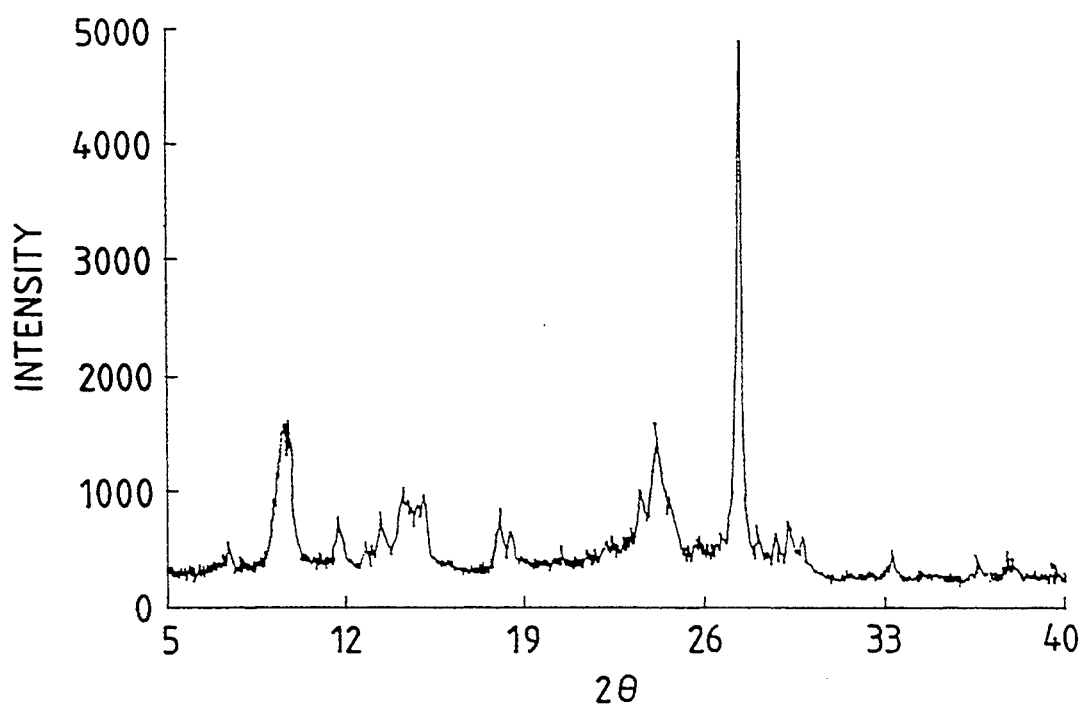
FIGS. 17 and 18 respectively show an X-ray diffraction pattern of the titanyl phthalocyanine crystal used in Comparative Example 2 and that of a charge generating layer of the electrophotographic photoreceptor using the same.
Figure 18:
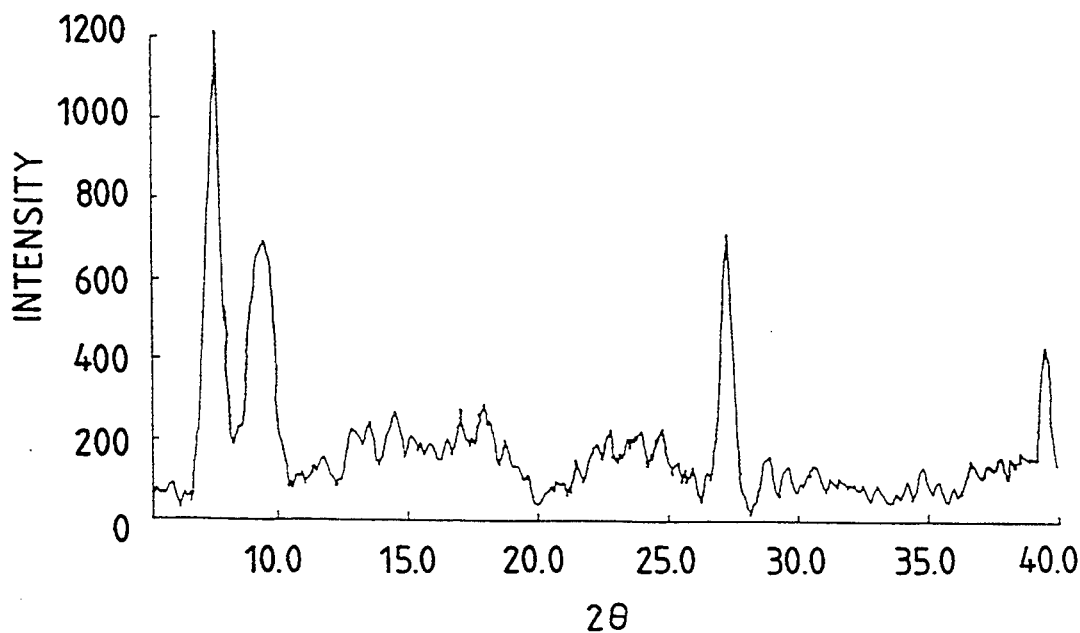

2.0 parts of the titanyl phthalocyanine crystal obtained in Synthesis Example were dissolved in 100 parts of 97% sulfuric acid at 0° C. and the solution was poured into 800 parts of ice-cooled water. The precipitated crystal was collected by filtration, washed successively with methanol, dilute aqueous ammonia and water, and then dried to obtain 1.7 parts of a titanyl phthalocyanine crystal. The resulting titanyl phthalocyanine crystal was stirred in methanol at 50° C. for 5 hours, filtered, washed successively with methanol and water, and then dried to obtain 1.6 parts of a titanyl phthalocyanine crystal. Observation of the resulting titanyl phthalocyanine crystal under a transmission electron microscope revealed non-uniform particles having a diameter of from 0.02 to 0.5 μm and an amorphous crystal form. An X-ray diffraction pattern of the resulting crystal is shown in FIG. 17. An electrophotographic photoreceptor was produced in the same manner as in Examples 10 to 14, except for using the resulting titanyl phthalocyanine crystal as a charge generating material. The resulting photoreceptor was evaluated in the same manner, and the results obtained are shown in Table 1. An X-ray diffraction pattern of the charge generating layer is shown in FIG. 18. As can be seen from FIG. 18, the peak at a Bragg angle ($2\theta \pm 0.2°$) of 27.3° is not the maximum, indicating that the crystal form had been transformed.

TABLE 1

| Example No. | Initial Electrophotographic Characteristics | | | Stability | Durability | |
|---|---|---|---|---|---|---|
| | $V_{DDP}$ (V) | $E_{\frac{1}{2}}$ (erg/cm²) | $V_{RP}$ (V) | $\Delta E_{\frac{1}{2}}$ (erg/cm²) | $\Delta V_{DDP}$ (V) | $\Delta V_{RP}$ (V) |
| Example 6 | −840 | 1.3 | 0 | 0.1 | 10 | 0 |
| Example 7 | −840 | 1.3 | 0 | 0.1 | 8 | 0 |
| Example 8 | −850 | 1.2 | 0 | 0.1 | 5 | 0 |
| Example 9 | −845 | 1.2 | 0 | 0.1 | 10 | 0 |
| Example 10 | −830 | 1.3 | 0 | 0.1 | 15 | 0 |
| Example 11 | −840 | 1.3 | 0 | 0.1 | 10 | 0 |
| Example 12 | −830 | 1.3 | 0 | 0.1 | 12 | 0 |
| Example 13 | −840 | 1.3 | 0 | 0.1 | 8 | 0 |
| Example 14 | −840 | 1.2 | 0 | 0.1 | 5 | 0 |
| Comparative Example 1 | −800 | 1.6 | 10 | 0.6 | 40 | 15 |
| Comparative Example 2 | −810 | 1.7 | 15 | 0.5 | 50 | 20 |

As described and demonstrated above, since the titanyl phthalocyanine crystal according to the present invention has a primary particle diameter of from 0.03 to 0.15 μm and exhibits a novel crystal form having an ellipsoidal tabular shape and a maximum peak at a Bragg angle ($2\theta \pm 0.2°$) of 27.3° in its X-ray diffraction pattern, it has increased crystal form stability against solvents and maintains its crystal form for an extended period of time in a dispersed and coated state. Hence, it is useful as a photoconductive material to provide an electrophotographic photoreceptor excellent in sensitivity, stability and durability.

While the invention has been described in detail and with reference to specific examples thereof, it will be apparent to one skilled in the art that various changes and modifications can be made therein without departing from the spirit and scope thereof.

What is claimed is:

1. A titanyl phthalocyanine crystal having a primary particle diameter ranging from 0.03 to 0.15 μm, showing a maximum X-ray diffraction peak at a Bragg angle ($2\theta \pm 0.2°$) of 27.3°, having a ellipsoidal tabular form, and having a BET specific surface area of not less than 35 m²/g.

2. A titanyl phthalocyanine crystal as claimed in claim 1, wherein said crystal has an adsorbed water content ranging from 0.5% of its own weight to the saturated water adsorption at 20° C. and 40% RH.

* * * * *